C. MASSERANO.
LOCOMOTIVE MOVED BY THE POWER OF ANIMALS.

No. 8,417.

Patented Oct. 7, 1851.

C. MASSERANO.
LOCOMOTIVE MOVED BY THE POWER OF ANIMALS.

No. 8,417. Patented Oct. 7, 1851.

C. MASSERANO.
LOCOMOTIVE MOVED BY THE POWER OF ANIMALS.

No. 8,417.  Patented Oct. 7, 1851.

C. MASSERANO.
LOCOMOTIVE MOVED BY THE POWER OF ANIMALS.

No. 8,417. Patented Oct. 7. 1851.

C. MASSERANO.
LOCOMOTIVE MOVED BY THE POWER OF ANIMALS.

No. 8,417. Patented Oct. 7, 1851.

C. MASSERANO
LOCOMOTIVE MOVED BY THE POWER OF ANIMALS.

No. 8,417. Patented Oct. 7, 1851.

C. MASSERANO.
LOCOMOTIVE MOVED BY THE POWER OF ANIMALS.

Patented Oct. 7, 1851.

C. MASSERANO.
LOCOMOTIVE MOVED BY THE POWER OF ANIMALS.

No. 8,417. Patented Oct. 7, 1851.

UNITED STATES PATENT OFFICE.

CLEMENT MESSERANO, OF TURIN, FRANCE.

LOCOMOTIVE MOVED BY THE POWER OF ANIMALS.

Specification of Letters Patent No. 8,417, dated October 7, 1851.

*To all whom it may concern:*

Be it known that I, CLEMENT MESSERANO, of Turin, France, a subject of the King of Sardinia, have invented certain new and useful Improvements in Apparatus for Applying the Force Exerted by Animals to the Purposes of Locomotion; and I do hereby declare that the following is a full, clear, and exact description of my said invention and of means of applying the same to various purposes.

The object of my invention is to apply the force exerted by animals to the transportation of passengers and merchandise with greater economy than has hitherto been obtained, and at the same time render the attainment of a higher velocity practicable without urging the animals employed beyond the speed at which they can work to the best advantage and without forcing them to work in disadvantageous positions. The first of these objects is effected by constructing the mechanism employed in such manner that the friction of the moving parts is reduced to the lowest limit attainable without uselessly increasing the complexity and weight of the mechanism; and the second object is attained by mounting the animals upon the car or other vehicle to be moved in such manner that the animals can work in their best positions and to the best advantage whether the plane in which the vehicle moved be horizontal or inclined.

My improvements are applicable to every species of locomotion whether on land, or in water.

The engine, or apparatus by means of which the force exerted by the animals is so modified that it can be readily applied to the propelling machinery, is essentially the same in all the various species of locomotion, and the means which are employed to reduce the friction of the moving parts are also essentially the same, although the arrangement and construction of both these elements must necessarily be varied to adapt them to the circumstances of the particular case to which they are to be applied.

In order that the nature and extent of my invention may be fully understood I will proceed to describe the machinery I have devised for carrying it into effect, referring to the accompanying drawings which are numbered respectively T, I, II, III, IV, V, VI, VII, VIII, VIII^bis, and IX; and in order that others may be able to apply my invention efficiently I shall describe certain mechanical apparatus to which I make no claim in this application but which I deem best suited to obtain the most advantageous results when used in connection with my invention.

The machinery or apparatus devised by me for applying these improvements to land conveyance is divided into two parts; viz, the carriage for containing the motive power, and the carriages for containing the articles to be transported. The first of these is analogous in its uses to the ordinary steam locomotive and is termed by me the impulsoria. The second are analogous to the ordinary cars or vehicles used for the transportation of merchandise, they are designed to be connected with the first and to be drawn by it; each of these vehicles consists essentially of a box or body for containing the articles to be transported, of the running gear by means of which the body is supported and enabled to move with but slight friction over the surface of the ground, and of the draught bar by which the vehicle is connected with the Impulsoria. The construction and arrangement of these parts and their connection with each other is fully shown, complete and in detail, by drawings T, I, II, III, and IV. The body may be constructed in any approved manner and may be either a plain box as represented in the drawings or may be constructed like the body of a covered wagon, or of a carriage for the transportation of valuable merchandise and passengers; but as the particular form and construction of the body forms no part of my invention I will not describe it in detail but will proceed at once to the running gear. The latter is composed mainly of the running wheels for rolling over the surface of the ground, of the axle to which they are secured and upon which the weight of the car body is carried, of the friction apparatus by means of which the friction of the carrier axle or axle of the running wheels is reduced, and of the brake by means of which the motion of the car is retarded or stopped when the operation is necessary.

Figures 1, 2, 11, 19:
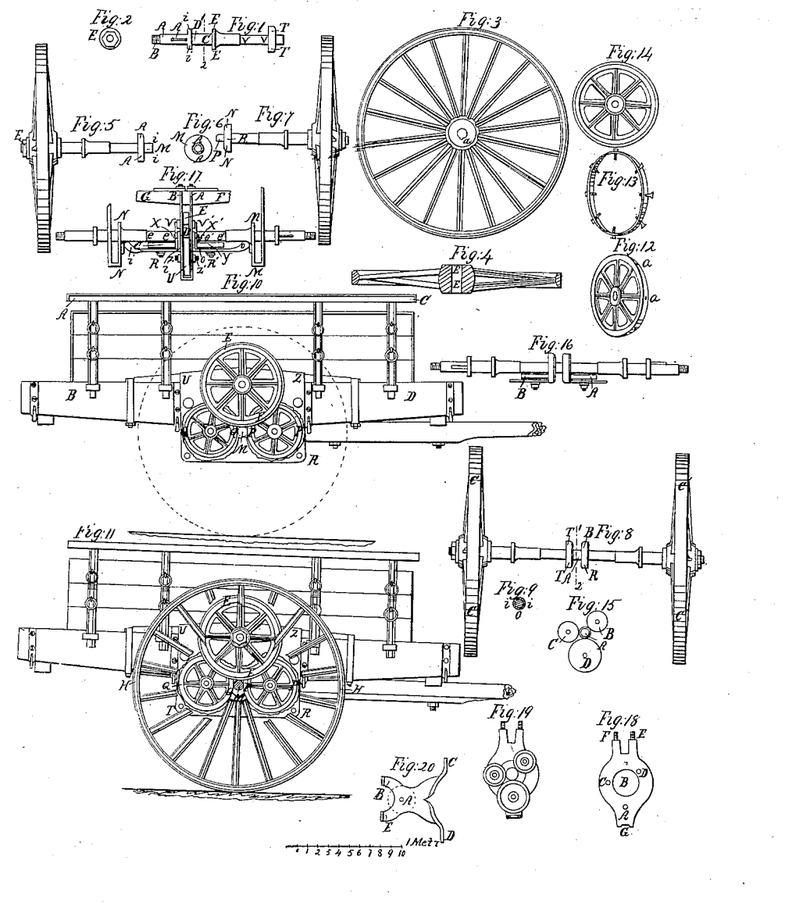
Figure 1:
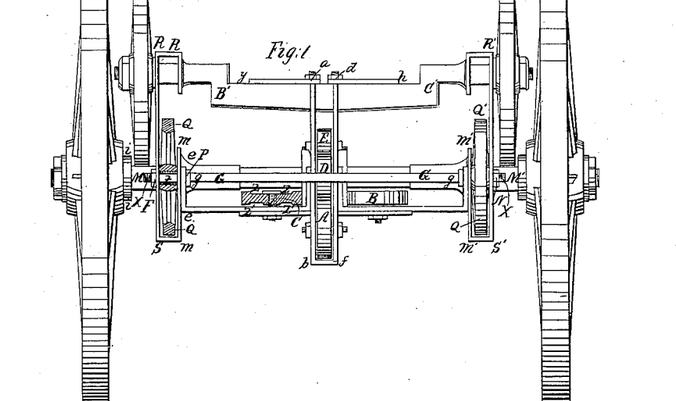
Figures 1, 2, 3, 8:
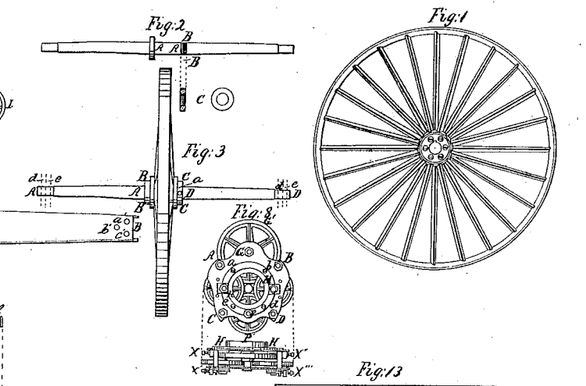
Figure 2:
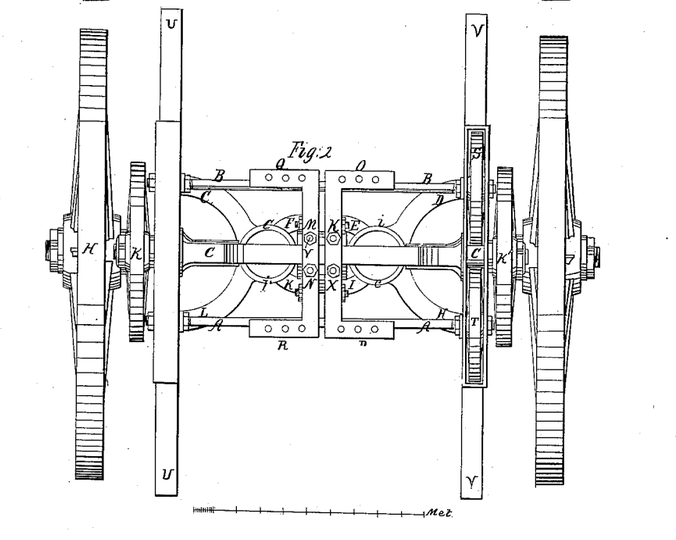
Figures 2, 3, 4, 6:
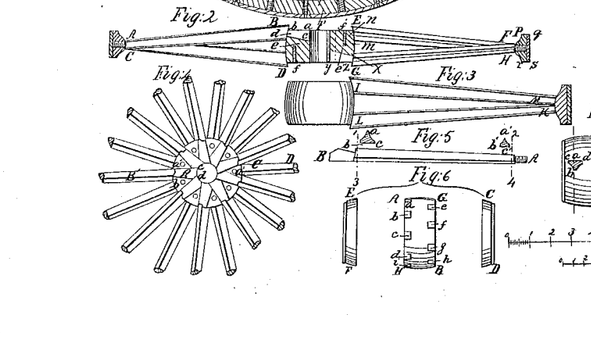
Figure 3:
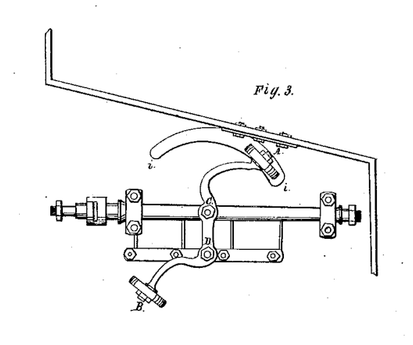
Figures 4, 5, 6, 7, 9, 10, 11, 12:
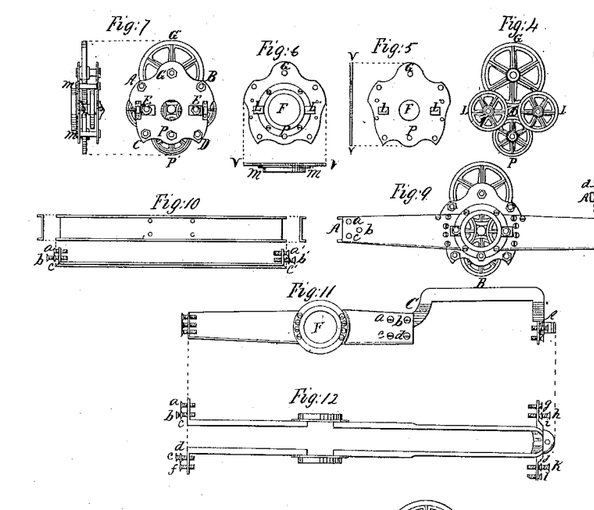
Figure 4:
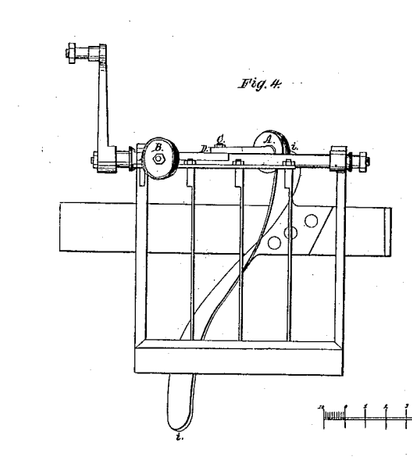
Figures 7, 8, 9, 10, 11:
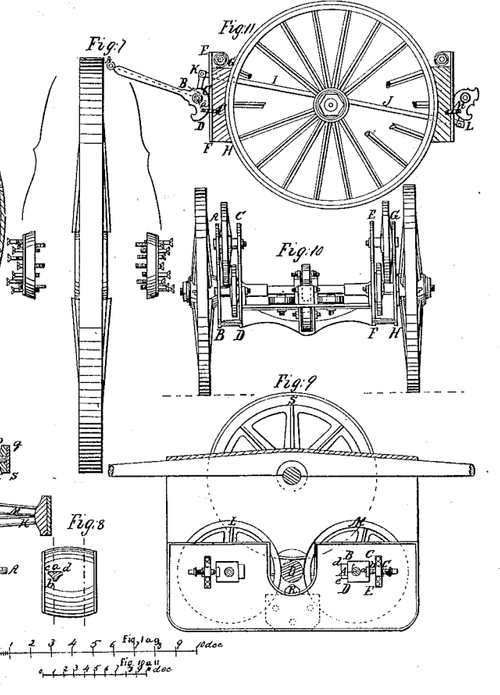

*And first, of the carrier axle.*—Each wheel of the vehicle in my system, has its own axle, independent of the other wheels. Figure 1 T, I, represents the form which I give to the axle. As each axle in my system must necessarily turn with the corresponding wheel, the latter is affixed to the extremity A A of the axle, by means of the feather O, O, which fits a corresponding channel *a* cut longitudinally in the interior wall of the hub, as is seen in E E, Fig. 4, and in Fig. 3. This or any other analogous method of mounting prevents the axle from moving without the wheel, to which it is firmly affixed. The extremity of the axle destined to receive the wheel has a screw (B Fig. 1,) cut upon it, to which a nut (E Fig. 2) is fitted by means of which the wheel and axle are firmly secured to each other. The axle of each wheel extends to the center of the vehicle where it meets the axle of the corresponding wheel upon the opposite side of the vehicle, and the two axles thus adjoining constitute a pair. One of the axles in each pair has a socket in its inner end at the center; the other on the contrary has on its inner end a projection or journal which enters the socket of the first axle thus connecting the two together, while at the same time they are free to turn independently. Fig. 5 represents the first named axle. Fig. 6 is an end view of the same, M is the socket, A is a collar formed upon the inner extremity of the axle. Fig. 7, represents the opposite axle, P, is the projection or journal thereon that enters the socket in the first axle, so that the end *i, i,* of the latter abuts against the face N, N, of the collar R of the former. Fig. 8 represents a pair of wheels thus coupled. Fig. 9 is a section of the same at the junction of the axles, or at the line 1 and 2 of Fig. 8. I call these wheels *c, c, c', c'* Fig. 8, carrier or running wheels, because in locomotion, they carry the weight and are in contact with the road, differing from the other wheels, which enter essentially into the construction of any carriage. I call the axle the carrier axle from the name of the wheel to which it belongs.

*Second, of the friction apparatus.*—The friction apparatus is composed essentially of three wheels which work in connection and constitute a set, one of which is applied to each side of the vehicle at the points where it is applied to the carrier axle. Side elevations of a vehicle placed in a proper position upon the carrier axle are represented at Figs. 10 and 11; A, B, C, D being the body and the frame thereof. I arrange the friction apparatus in such manner with respect to the carrier axle that one of the wheels E, E, of the friction apparatus rests perpendicularly on the carriage axle, its circumference being parallel to the circumference of the adjacent carrier wheel and being as near as possible to the same carrier wheel without touching it. I call the first mentioned wheel of the friction apparatus the bearer because it bears upon the carrier axle with all the weight of the body and of the load of the side of the vehicle to which it is applied. The two other wheels Q, Q; P, P, (Figs. 10 and 11, T, I,) of the friction apparatus, are situated parallel to the bearer, the one (P P) in front and the other (Q Q) behind the carrier axle, the axles of the two friction wheels being in the same horizontal plane as the axis of the carrier axle; they are also placed as close as possible to the adjacent carrier wheel, the space between their faces and the adjacent face of the latter being barely sufficient to permit the bearer to turn freely.

That portion of the carrier axle (D C Fig. 1, T, I,) which comes in contact with the friction apparatus is of cylindrical form, and constitutes the journal, which is carefully hardened; at its two extremities are two collars *i i* E E. The outer one (*i i*) of these collars serves to prevent the carrier wheel from working endwise upon the axle and is termed the collar of the carrier wheel. The other collar E E may be omitted if thought proper.

Figs. 1 and 2 T II, represent respectively a front elevation and a plan of the running gear of a vehicle constructed as above described; M M Fig. 1 being the journals of the carrier axle; K, K', the bearers; Q, Q, and Q', Q', Fig. 1; and T, and S, Fig. 2, being the lateral friction wheels. That lateral wheel (Q Q Figs. 10 and 11 T I) which in the forward movement of the vehicle follows the carrier axle, I term the impeller because it transmits the impelling or motive force to the carrier axle and thus causes the carrier wheel to advance upon the surface of the ground. The object of the other wheel P P (Figs. 10 and 11, T. I,) which is placed before the carrier axle is to steady the latter and to keep it in proper position in backing, stopping, and slackening the speed of the vehicle. The space between the peripheries of the wheels Q Q and P P, Figs. 10 and 11, is barely sufficient to admit the carrier axle M, so that the latter bears against their peripheries. Hence the carrier axle touches the peripheries of the three wheels of the friction apparatus at three points, which united by as many straight lines would form a rectangular isosceles triangle, of which the apex opposite the hypothenuse would be the point of contact of the bearer, and the side of the vehicle rests astride of the carrier axle, without being able to touch it, otherwise than through the intervention of the peripheries of the wheels which constitute the friction apparatus.

The objects I propose to effect by the friction apparatus are that the vehicle be made to rest on the peripheries of three wheels mounted on the carrier axle in the triangular position above mentioned, and in the greatest possible proximity to the carrier wheel, both of which are essential requisites in the construction and arrangement of the friction apparatus; as for the rest I construct each of the three wheels of the apparatus, with a fixed axle or with a turning axle as may be best suited to the form of the vehicle and to insure its solidity in any particular case. For the same reasons I employ according to circumstances either an independent or separate axle for each wheel of the apparatus and support it firmly at the side of the vehicle; or I employ axles of forged iron which extend from one side to the other, across the body of the vehicle and have each two opposite and corresponding wheels fitted to them. Fig. 1, T, II, represents an example of this second method of arranging the axles of the wheels of the friction apparatus, B' C' being an axle common to the two bearers K, K', of the same couple; such an axle I name from the wheels to which it belongs, the bearing axle; G, G, is the axle of a couple of lateral wheels and may be called the impelling axle. The axles which bear the lateral wheels are themselves borne by plates of iron R, S, m, m, R', S', m', m', which serve as boxes for the lateral wheels. These plates are borne by the bearing axle. One of these lateral wheels Q, Q, is represented in section in order to show a smooth cylindrical iron tube t, or sleeve, which is interposed between the axle and the wheel. This sleeve is just as long as the space between the plates of the friction apparatus R, S, m, m, and prevents the plates from being forced by the screw nuts F, N, at each extremity of the axle of the laterals into too close contact with the hubs thereof; the laterals are therefore permitted to turn freely upon the sleeves and between the walls or plates while the sleeves are prevented from turning by teeth which enter the walls or plates.

In the figure represented upon T III, A, B, C, F, G, H, is a side view of the iron wall or plate of which R, S, Fig. 1, T, II, is an end view. At D, E, T, III, are shown the axles of the two laterals, which are inclosed between the two walls of the apparatus.

Fig. 10, T, IV, represents an example of the other method of arranging the axles of the wheels of the friction apparatus, that is to say with a separate axle for each wheel of each set. A, B, C, D, are the walls of the friction apparatus of one side of the vehicle and E, F, G, H, are the walls of the apparatus of the opposite side, this method I prefer for the vehicles in which the bodies are mounted upon springs.

Figure 13:
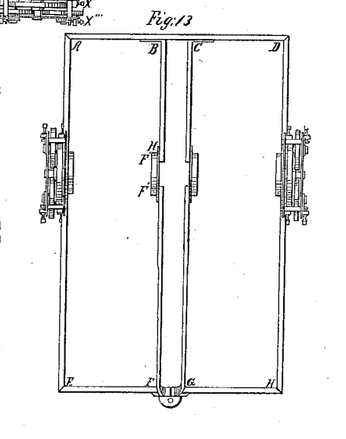
Figure 14:
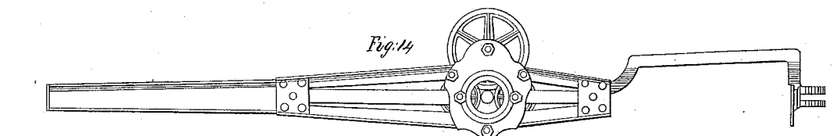

The friction apparatus may at least in part be inclosed within the side of the vehicle; an example of this method of construction is shown in T, III, where the only portion of the friction apparatus that is exposed is the bearer, the laterals being inclosed in the sides of the vehicle, between the two walls of iron, of which A, H, is the exterior, B, C, F, G, the heads of so many screws by means of which the walls of the apparatus are bound together and to the body of the vehicle itself. In Figs. 10 and 11, T, I, the exterior wall is represented as broken in order to show the lateral wheel. In Fig. 2, T, II, U, U, is the connecting plate walls of the same apparatus seen from above. The connecting plate of the friction apparatus at the opposite side of the same vehicle is represented at V V and the upper plate of this apparatus is removed to show the lateral wheels S, T. The axles of the latter are supported in their bearings in the walls of the apparatus in such manner that while they are prevented from moving away from the carrier axle, they can be set up toward it whenever the diameters of the wheels or axles are reduced by wear. The apparatus for effecting this adjustment of the friction wheels is arranged, in the following way, and is annexed to the inner wall of each friction apparatus. The construction of this device is fully represented at Fig. 9, T, IV, which is an elevation of the inner walls of the friction apparatus, H being the carrier axle, S, the bearer; L, M, the laterals; A the axle of the lateral M; B, C, D, E, support or box of the axle A; a, lug on the box against which the screw b, c, acts. The box is supported by the walls, so that under the action of the screw, it can be moved toward the carrier axle H. A stop block R, is secured to the wall of the apparatus immediately below the carrier axle H. The object of this stop block is to prevent the carrier axle from becoming displaced by the shocks when the vehicle is moving, and to support the carrier axle whenever the carrier wheel is dismounted from its axle for the sake of repairs or for other causes. This stop block is extended as far as the supplementary collar upon the carrier axle without however touching it, in order to support it and prevent the endwise movement of the axle in case that the collar near the center of the vehicle should fail to perform its office. I construct the wheels of the friction apparatus of cast iron with a wrought iron tire; the cast iron wheel is truly turned before the tire is applied to it, and the latter is secured to the cast iron wheel by means of as many screws as there are spokes in the wheel. Fig. 12, T, I, represents one of these wheels prepared to receive the tire which is represented with the screws in Fig. 13. When the tire is screwed fast, the periphery must be again turned true. A wheel thus finished is represented at T, I.

Figure 15:
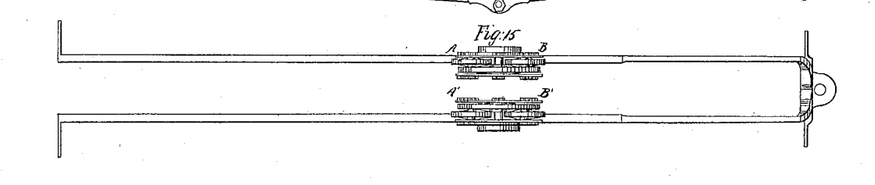

*Third of the construction of the apparatus of the free axle.*—Under the vehicle in the middle, between the two carrier wheels of the same couple, where the junction of the carrier axles is effected, I arrange a special apparatus which I call apparatus of the free axle. This apparatus makes a part of the vehicle, and its object is to hold fast the extremities of the carrier axle and to keep them in their places whether they are coupled together as shown in Fig. 8 T, I, or are secured to the body of the vehicle, as in Fig. 1, T, II. This apparatus which is repeated for every pair of carrier wheels is secured to the body of the vehicle by means of a connection which I call the hand. This hand is made of such form that it will support five disks arranged as follows: Three of the five disks are disposed in the form of a triangle; their circumferences all lie in the same plane and are parallel with the circumferences of the wheels of the friction apparatus; they embrace the coupling of the carrier axles (A Fig. 8, T, I, is the coupling of the carrier axles which is surrounded by the three disks). The relative positions of this coupling and the three disks which surround it is shown at Fig. 15, T, I, which represents a transverse section of the coupling of the axles and the disks surrounding it, A being the coupling and B, C, D, the three disks. Two of the latter, C and B, are equal in dimensions; their diameter is generally about two thirds of that of the third disk D. This last is placed under the carrier axle, so that its center is in the perpendicular line let fall from the center of the coupling of the carrier axles. I give it the name of the carier disk, because it serves as the support upon which the coupled extremities of the two carrier axles rest, and find a common support, and are retained in proper position. The second disk C, I call the rator disk, because its office is to keep the carrier axles in place; it precedes the carrier axle; its point of contact with the axle is one quarter the circumference of the axle from the point of contact of D. The third disk B, which I call the corrutor, is placed equidistant between the disks C and D on the opposite side to C. Each one of the carrier axles, near their coupling A, Fig. 8, is fitted with a collar, T, T, R, R. The adjacent faces of these may be of any shape but their outer sides, or those next to the carrier wheels, must have a crowning, or flat surface against which the peripheries of the two equal disks B and A, fig. 16, bear in a horizontal direction. The position of these two disks (B and A) may be varied, provided they are arranged in such manner that they effect the object for which they are designed, viz—to keep the two carrier axles coupled and pressed together. In general I arrange them according to the method above described.

Figures 16, 17, 18, 19, 20, 21, 22, 23, 24, 25:
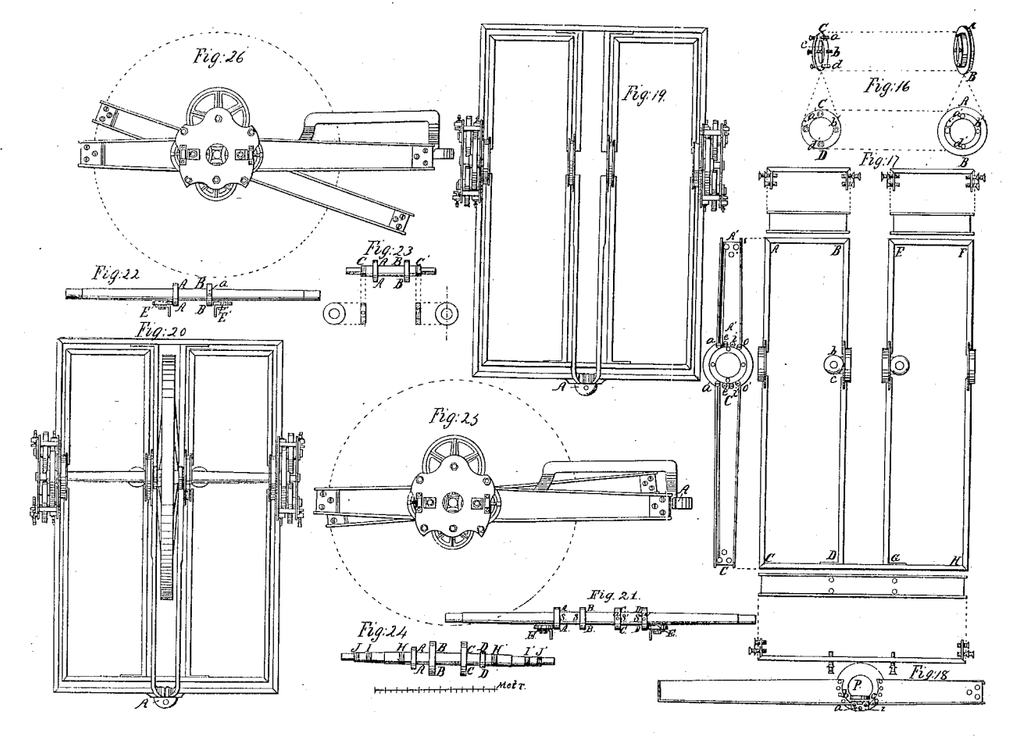

Fig. 17, represents a couple of carrier axles furnished with the apparatus of the free axle. The five disks U C D Y E are supported by the hand B, B, A A, i, i, o, o. The construction of the hand is fully shown in Figs. 17, 18, 19, 20, T. I. From the bearing axle, G, F, Fig. 17, descend two iron walls B, B, A, A, which I call mandolins. Fig. 18, is a side view of one of these walls. They support the axles of the carrier disk, the rutor and corrutor, which are placed between the two; the extremities of these axles are respectively indicated by the letter X, X, and V V', C A D. Fig. 18, are the holes in the mandolin through which these axles are passed; B opening in the mandolin to admit the carrier axle. The two mandolins are rigidly connected to the bearing axle G, F, by means of the screw bolts F, E, Fig. 18. Fig. 19, is a view of the three disks connected with the mandolin, showing the space afforded for the passage of the carrier axle. The disks, C, and Y, Fig. 17, are sustained by horizontal crosses of iron $i\,i$, $o\,o$, respectively. The inner sides of these crosses are attached to the inner walls of the respective friction apparatus N, N, M, M. Fig. 20 is a plan of one of these crosses; B and E are the arms which connect the mandolin. C and D are arms which connect it with the walls of the friction apparatus, and A is the hole in which the pivot of the disk Y, Fig. 17, is inserted. R, R', Fig. 17 are the heads of the pivots of the disks C and Y. That portion of the carrier axle ($e\,e$, $e'\,e'$, Fig. 17) which passes along the cross is of a truly cylindrical form, which leaves room for the free rotation of the disks, that touch it only on the crown of the surface of the respective collars. The arrangement of the apparatus of the free axle with its five disks is fully shown at Fig. 1, T, II. All the disks of the apparatus of the free axle are made concave on both bases, as can be seen in Z, Z, Z', Z' of the disk C; the object of this is to diminish their mass, as far as practicable without injuring their solidity. The apparatus of the free axle may be inserted in the bottom of the body of the vehicle, care should be taken to protect it from injury by an exterior casing. A portion of this case is seen at K I, T, III. In the apparatus of the free axle, I prefer to employ disks rather than wheels, because they do not present the interstices of spokes, and consequently are not exposed to the danger of being checked in their rotation or clogged by the accidental intervention of any foreign body. The disks are formed of cast iron and are turned true and smooth.

*Fourth, of the construction of the carrier wheels;* I give to the spokes of these wheels a form which I call bayonet, each having the form of a triangular prism, two sides of which are slightly concave, and which increases in size from the periphery of the wheel to the hub, in such manner that its size at the hub is about double that at the periphery. Fig. 5, T. IV, represents the spoke. $a, b, c, a', b', c'$, are transverse sections of the same, following the lines 1 and 3, 2 and 4, and representing respectively the plan of the spoke at the hub, and at the periphery. The outer extremity of the spoke terminates in a screw A by means of which it is attached to the periphery of the wheel. The spoke at its inner-extremity terminates in a dove tailed snug B which is fitted into a corresponding socket in the hub. These sockets are formed alternately upon opposite faces of the hub as shown at Fig. 6, so that the spokes dish alternately in opposite directions as shown in Fig 2, T, IV, and the wheel when finished has the general form of a double cone A B E F, H G D C. In order to secure the spokes in their sockets in the hub the latter is formed of three pieces as shown at Fig. 6, T, IV, the contral one or trunk (A G H B,) containing the sockets, and the outer one (C D, E F,) forming caps which are firmly secured to the trunk after the spokes are in place by means of screw bolts the sockets of which are shown at *f*, *e*, Fig. 2. The trunk of the hub may be formed of cast iron but the remaining parts of the wheel should be of wrought iron.

In wheels of ordinary dimensions the extremities of the spokes should all be ranged on the periphery of the wheel in the same line as shown at Fig. 2, T. IV. But in wheels of large dimensions advantage should be taken of the greater breadth of the periphery to range the outer extremities of the spokes in two circumferential lines as shown at M K, Fig. 3, care being taken to enter the extremity of each spoke on the same side of the periphery that it starts upon from the hub.

In general for wheels of second size I adopt eighteen spokes. I designate this system wheel with the appellation of elastic wheel, because this method of construction gives to the carrier wheels not only perfect solidity, but also the other quality, eminently essential to carrier wheels that is to say perfect elasticity.

*Fifth, of the construction of the brakes.*— I apply to each vehicle a system of brakes, which I term "brake with increasing leverage," because it acts with increasing leverage against the wheel to be stopped as the power applied to it is increased. This brake consists mainly of two rubbers which are applied to the opposite sides of each carrier wheel, and are actuated by means of a lever. The front rubber (E, F, G, H,) Fig. 11, T IV is pressed directly against the adjacent periphery of the carrier wheel by means of the lever A, C, D, which is secured at a point B intermediate between its extremities to a rock shaft of iron which crosses the vehicle and forms also the fulcrum for the brake lever of the opposite carrier wheel. The shorter arm of the brake lever which bears against the back of the rubber has the form of an ear C, D, the periphery of which is eccentric to the pivot B of the lever, so that as the longer arm of the lever is depressed through a succession of equal spaces, the corresponding spaces described by the rubber continually decrease. This eccentric portion of the lever, or ear as it may be termed, is connected with the adjacent rubber by a link *a*, *c*, so that when the lever handle is raised the rubber is drawn out of contact with the periphery of the carrier wheel. The rubber upon the opposite side of the carrier wheel is operated by a similar ear M, which is connected with its adjacent rubber by a link. This ear is also secured to a rock shaft which crosses the vehicle and forms the fulcrum of the corresponding ear upon the opposite side of the vehicle. These two rock shafts are connected by means of a link bar K, I, J, L, and arms, in such manner that when the forward one B, is turned by moving the brake lever A, the hinder one is correspondingly turned, and the four ears acting upon their respective rubbers are moved either to force them against the peripheries of the carrier wheels or to withdraw them therefrom. The rubbers are arranged in such manner that when they hang perpendicularly from their points of suspension they do not touch the peripheries of the wheels. The whole arrangement is fully shown at T, III, where Q, Q, are the rubbers; O O are the points of suspension; S, S, the two rock shafts *a*, *a*, *a*, *a*, the links and L the brake-lever.

*Of the impulsoria.*—The impulsoria is constructed of iron, with the exception of certain parts, which will be mentioned; it runs on the road with one wheel which I call the driving wheel, because it receives directly the action of the moving force, and transmits it to all the carrier wheels of the train or convoy which it is desired to propel; thus the impulsoria is composed essentially of the driving wheel and axle, and of the carriage destined to contain the moving force, which for that reason I call the portemoteur or power-carriage.

*First, of the construction of the driving wheel.*—The driving wheel, Fig. I, T, V, is constructed in the same manner as the carrier wheels of the vehicles, with the exception of the dimensions, which are proportioned to the power which it is designed to give to the impulsoria, but are always a little greater than the dimensions of the carrier wheels.

*Second, of the construction of the driving axle.*—Fig. II T, V, represents the driving axle, its length is the width of the impulsoria. The driving wheel is mounted at the middle A A of its length and is fixed there, as shown in Fig. III, between two collars B, B, C, C, one of which B B is in one piece with the axle; and the other, C, C, is separate in order that it may be removed when it is desired to mount or dismount the driving wheel; *a*, is a hole in the movable collar to receive the extremity of the lever by means of which this collar is screwed up against the hub of the driving wheel or unscrewed therefrom. The two parts A, A, D, D, Fig. III, of the axle I call arms of the driving axle, and it is upon these arms that the power carriage is borne through the intervention of proper connections.

*Third, of the construction of the power carriage.*—This carriage is composed of two sets of friction apparatus and of a frame in the form of a triple parallelogram, on which the remaining parts of the impulsoria are mounted. The construction of the friction apparatus of the power carriage is like that of the vehicles with the difference that in place of three friction wheels, four are used, each of which has a separate axle. The relative positions of the four wheels and the driving axle are represented at Fig. IV, (T, V,), A being the driving axle. The fourth wheel P is situated immediately under the driving axle; I call it the carrying wheel because its office is to carry the driving axle, and keep it in its place, in case any sudden bound or shock should cause the impulsoria to rise. Fig. V, and VI are elevations of the two walls of the friction apparatus, G, P, L, L', being the positions occupied by the axles of the four friction wheels; in the middle of each wall there is a circular opening F, through which the arm of the driving axle passes without touching, as the axle is sustained in the center of the opening by the peripheries of the friction wheels, as may be seen in Fig. VII. The opening in one wall, as shown at Fig. VI, F, is larger than that in the other for a purpose of which I will speak in its proper place; and it is surrounded by a flange (*m*). Fig. 8, is a similar view of the opposite side; the lateral wheels are mounted in the frame with the movable adjustable boxes (E E Fig. VII and X X', X'' X''', Fig. VIII,) spoken of in describing the friction apparatus of the vehicles (T, IV), in order that these wheels may be kept in contact with the driving axle as their size is diminished by wear.

*Fourth, of the construction of the frame of the power carriage.*—The frame of the carriage has the form of a parallalogram Fig. XIII, A D E H, which is divided into three smaller parallelograms by means of two longitudinal bars B, F and C, G. The outer sides of the frame are formed by prolonging the side walls of two sets of friction apparatus, as shown in elevation at Fig. IX; they are connected with the cross bars A D and E H, by means of screw bolts whose arrangement is fully shown at Fig. X, which is an elevation of one of the cross bars. The partitions shown in elevation and plan at Figs. XI and XII, are also connected with the cross bars by bolts. They have openings F in them, corresponding with the central openings of the sets of friction apparatus, for the passage of the driving axle, and they are arched upward, as shown at B Fig. XI, and connected together at their hinder extremities before being made fast to the cross-bar. In impulsorias of small power, say for two horses, the space between the partitions is barely sufficient to permit the driving wheel to turn freely; but in those of greater power, say for four horses, circular openings of these partitions are fitted with sets of friction apparatus and the partitions are necessarily set at a greater distance apart to give room for the friction apparatus; an elevation and plan of such a pair of partitions is shown at Figs. XIV and XV, T, V.

*Fifth, of the construction of the driving apparatus.*—This apparatus consists mainly of an endless band or platform on which the horses are mounted, and which is passed around two sets of polygonal wheels, and of the frame upon which the platform and wheels are supported. The latter is composed of two parallel frames A, B, C, D and E F G H Fig. XVII, T, VI, which are connected at their hinder extremities by the cross bar C, D, G H, and are supported within the frame of the power carriage by hollow trunnions which are concentric with the driving axle and whose construction is shown in detail at Fig. XVI. The hinder cross bar (C D G H, Fig. XVII) which connects the two frames, passes beneath the arch of the partitions of the carriage frame, and the two frames when connected have the appearance shown at Fig. XIX. When the driving wheel is applied the several parts occupy the positions in which they are respectively represented in plan at Fig. XX. This method of connecting the frame of the driving apparatus with the carriage frame by means of trunnions, permits the former to rock in the latter and to occupy the positions in which it is shown at Figs. XXV and XXVI. In order to steady the driving axle and to prevent its endwise movement, the driving frame is fitted with two horizontal disks *b*, *c*, Fig. XVII and XVIII which bear against the outer faces of the collars upon the driving axle; the two when the latter is in place occupying the positions in which they are represented in Fig. XXII. When the impulsoria is of large size and the partitions of the carriage frame are at a greater distance apart, supplementary collars are applied to the driving axle as shown at A A, and D D, Fig. XXI.

The endless platform is divided into two sections one of which corresponds with each compartment of the frame of the driving apparatus and which are situated upon opposite sides of the driving wheel. Each of these sections is composed of a series of rectangular tablets of wood connected together at their adjoining edges as shown at Figs. XXXIV, XXXV, XXXVI and XXXVII, T. VII. Each tablet is fitted with four small wheels also shown in the above figures, which run upon rails secured to the frame and thus support that portion of the endless platform which extends between the polygonal wheels around which it is passed. The polygonal wheels are arranged, in sets of two each, upon axles situated at the opposite extremities of the compartments of the frame of the driving apparatus. The forward set appertaining to each section of the endless platform is fitted to a separate axle whose construction is shown at Fig. XXIII, T. VI, and whose journals are supported by sets of friction wheels secured to the side pieces of the frame as shown at Figs. XXX, XXXI and XXXII T. VII. Each of these sets of friction wheels consists of three wheels whose positions with respect to the journal of the polygonal wheel axle as shown at Fig. XXX. The two sets of polygonal wheels around which the hinder portions of the sections of the endless band are passed, are both secured to a common axle (Fig. XXIV T. VI) whose journals are supported by sets of friction apparatus each of which comprises four wheels arranged as shown in Fig. XXXII. The polygonal wheels are secured to their respective axles between collars as shown at Figs. XXVIII and XXIX, and the shaft of the hinder sets of polygonal wheels is prevented from working endwise by a horizontal disk e, f, Fig. XXXI, which is pivoted to the frame between two collars a, b, c, d, and bears upon the adjacent face of one collar or the other, as the shaft tends to work endwise in one direction or the other. When the polygonal wheels are in place the several parts of the machine occupy the positions in which they are represented in plan at Fig. XXXIII; when the sections of the platform are in place the several parts of the driving apparatus occupy the positions in which they are represented in elevation at Fig. XXXIX. E being one of the hollow trunnions A, the axle of the forward polygonal wheels and B C D the axles of its respective friction wheels; J is the axle of the hinder polygonal wheels; R S is one of the rails upon which the wheels of the endless platform run, and T U V is one of four parallel rails which support the axles of two series of friction wheels upon which the lower parts of the sections of the endless platform are supported between the two sets of polygonal wheels. A modification of this arrangement for supporting the endless platform between the polygonal wheels is shown at Fig. XL, where the friction wheels which support the upper side of the endless platform are secured to stationary rails instead of being connected with the tablets of the endless platform.

The horses whose force is to be exerted in propelling the machine are mounted upon the platform as shown at Fig. XXXIX and are hitched to a hook secured to a frame which is erected upon the frame of the driving apparatus, so that as they move their feet the tablets of the platform are caused to move in endless succession beneath them. The power thus exerted by the horses is transmitted to the driving shaft through the intervention of a train of cogwheels, the first of which is either secured to the axle of the hinder set of polygonal wheels or is secured to a separate axle and put in motion by cog teeth secured to the under sides of the tablets of the endless platform. In the former case the hinder set of polygonal wheels are fitted with teeth (as shown at a, b, c, d, Fig. XXXII) which catch in sockets a c r o, Fig. XXXVII, formed in the inner sides of the tablets and thus insure the turning of the polygonal wheels and the shaft to which they are secured. The cogwheel secured to this shaft gears into a pinion on an intermediate shaft (as shown at I K J L, Fig. XLIII, which is fitted with a series of cogwheels C' D' E' F' G' H') and a corresponding series of wheels (C D E F G H,) are secured in inverse order to the carrier axle A, B. The wheels upon the intermediate shaft act upon the corresponding ones on the carrier axle through the intervention of a shifting pinion (C. Figs. XLI and XLII) which is pivoted to a radius bar (E F G) and can be shifted from one pair of wheels to the other according as the carrier axle is to be driven with greater or less speed. This shifting pinion can be thrown in or out of gear with the pair of wheels with which it is acting at the time by means of an ear or cam I H which is secured to a rock shaft that can be moved by the conductor of the machine, whenever it is necessary to connect or to disconnect the carrier axle with the endless platform upon upon which the horses act. The two positions of the shifting pinion are shown at Figs. XLI and XLII, where A is the master wheel upon the axle of the hinder polygonal wheels. B is one of the wheels upon the intermediate shaft, C is the shifting pinion, and D is one of the wheels upon the carrier axle. I H is the cam on the rock shaft and E, F, G, is the bar to which the shifting pinion is pivoted. In Fig. XXXIX J is the axle of the hinder polygonal wheels, E the intermediate shaft, P one of the intermediate wheels and Q the shifting pinion.

The arrangement for transmitting the motion through a master wheel G F secured to an independent shaft and driven by means of racks secured to the tablets A C of the endless platform, is shown at Fig. XLIV.

*Sixth, of the apparatus for attaching the impulsoria to its convoy.* The impulsoria is preceded by a two wheeled vehicle which I term the pilot as its office is to govern the direction in which the train is to move. This vehicle is shown at Figs. XLV, XLVI, XLVII, XLVIII and XLVIX. TVIII; it consists of a frame mounted upon the axle of the two running wheels through the intervention of two sets of friction apparatus similar to those of the impulsoria. A horizontal wheel (S S Fig. XLVII, and Fig. XLIX) is secured to the frame of the pilot and the upper side of its rim is grooved to admit a ring tongue formed upon the lower face of a similar wheel (A A Fig. XLVII and Fig. XLVIII) the two being connected by a king-bolt which is passed through suitable apertures in their centers. The upper wheel is connected with the front extremity of the frame of the impulsoria by a frame A B C D (Figs. XLV and XLVI), which is arched upward sufficiently to permit the wheels of the pilot to turn freely beneath it. This arched frame terminates in an axle (E F Fig. XLVI) which rests in pillow blocks secured to the wheel A A Fig. XVII or C¹ C² C³ and C⁴ Fig. XLVI, and is also fitted with an upright arm (D Fig. XLVII). The latter is toothed at its upper end and gears into a pinion secured to an arch K Fig. XLVI made fast to the wheel C¹ C² C³ C⁴. The pinion shaft is fitted with a lever handle by means of which the body of the impulsoria behind may be rocked to one side or to the other as may be necessary to maintain it in an erect position when moving over uneven ground. In order to steer the machine the wheel S S, Fig. XLVII, is fitted with an annular set of teeth, A B C, Fig. XLIX, which gear into a pinion as shown at Fig. XLVI. The pinion is secured to the lower extremity of an upright shaft whose upper extremity is fitted with a lever handle T, Fig. XLVII, by turning which the axle of the pilot may be turned obliquely to the carrier axle to cause the impulsoria to deviate to the right or to the left of the direction in which it is moving at the time.

The hinder extremity of the frame of the impulsoria is connected with the train of vehicles to be drawn through the intervention of a two wheeled vehicle which I term the follower. The frame of this follower is connected at its front extremity with the hinder part of the frame of the impulsoria by means of a bolt N, Fig. XLVI. The hinder part of the frame of the impulsoria has also a frame work O P Q R S which bears upon the frame of the follower at the points M L O, so that the latter tends to steady the impulsoria while at the same time ample space is afforded for the oblique movement of the axle of the follower when the impulsoria is turning curves. The axle of the follower is fitted with suitable sets of friction apparatus similar to those described for the other vehicles. The draft bar of the vehicles which immediately succeeds the follower is made fast to it as shown in dotted lines in Fig. XLV.

In order to prevent accidents and to afford a temporary support to the impulsoria I attach a supplementary wheel to each side of its frame. One of these wheels is represented at Fig. LI. The axle of each of these wheels is connected with a lever G K by means of which it can be raised from the ground or depressed upon it at pleasure. When the impulsoria is doing its duty properly these wheels are drawn up from the ground so that the whole weight is thrown upon the carrier wheel, but in uneven ground or in case of the accidental derangement of the carrier wheel these supplementary wheels will be found useful to afford a temporary support for the frame of the impulsoria or to prevent its upsetting.

As before stated the frame of the endless platform is constructed to rock upon its hollow trunnions so that it may be placed in different inclinations with respect to the frame of the impulsoria; this change of position is effected through the intervention of a rack and pinion, the first of which is attached to the hinder part of the frame of the endless platform, while the latter is secured to a shaft upon the frame of the impulsoria; this shaft is fitted with a crank by moving which the pinion may be turned and the inclination of the endless platform changed. The several parts of this mechanism are shown at Fig. XLV where J is the crank on the pinion shaft and K is the rack; also at Fig. XLVI; and the attachment of the rack is shown at Fig. XXXIX T. VII. The object of this arrangement is to enable the conductor of the train to maintain the endless platforms at the angle to which the horses can work to the best advantage whether to retard or to accelerate the movement of the impulsoria irrespective of the change in the inclination of the frame thereof in traversing, ascending and descending grades. In ascending the hinder part of the endless platform is raised and in descending it should generally be lowered. This arrangement is imortant, as without it the power exerted by the horses would vary with the slope of the road and in those cases where most power was needed they would be working at such a disadvantage that but a small portion of their power could be made available.

The articles to be transported may be loaded in part upon the impulsoria and in part upon the vehicles which it draws. Where but a small amount of freight is to be transported or when great speed is required, it may be placed wholly upon the impulsoria and the train of vehicles should be dispensed with. Passengers may be accommodated in a body secured to the pilot or in some of the vehicles according to their number or the speed at which the journey is to be accomplished.

The apparatus I have thus far described is fitted for traversing common roads. It may however be applied to railways by merely changing the wheels which should then have flanges to keep them upon the rails. The propelling apparatus may also be applied to transportation by water in which case it should be applied to driving paddle wheels such as represented at T, I, X. These wheels are of the feathering variety or in other words their paddles are caused by suitable mechanism to maintain their vertical positions during their rotation around the axis of the wheel. In order to effect this the paddles are secured to independent shafts which are each fitted with an arm; and all the arms of the whole series of paddles are connected with a ring which is maintained in a position eccentric to the paddle wheel shaft by two wheels of less diameter than that of the ring. By this arrangement the paddles although carried around by the rotation of the wheel frame are maintained in a vertical position as shown in Figs. 1 and 2 T. IX. In order that the paddles may not be resisted by the air in their rotation I construct each paddle of a series of sections which are pivoted at one of their sides to a frame that surrounds the whole set which constitute a paddle and is secured to the shaft E E, Fig. 2, T, VIII$^{bis}$ each section is also connected at its opposite or far side with a bar which is connected with the paddle shaft by means of a lever (C D T, VIII$^{bis}$); the arms of this lever are prolonged on each side of the paddle shaft and are fitted at their extremities with friction wheels A B. Inclined tracks $i\ i$, are secured to the sides of the vessel or to the frame which supports the outer pillow block of the paddle wheel shaft in such position with respect to the friction wheels that those (B) at the hinder side of the wheel run in succession upon the hinder track just after their respective paddles ascend from the water and thus turn the lever C, D, to cause all the sections simultaneously to turn upon their pivots like doors and assume directions perpendicular to the paddle wheel shaft, as shown at Figs. 3 and 4. They remain in this position until just before they enter the water when the other friction wheel (A) runs upon the forward track and turns all the paddles back again into directions parallel with the paddle wheel shaft, as shown at Figs. 1 and 2. The sections of the paddles thus open while passing through the air and present their edges to it, while they close as they enter the water and present their faces. In order that the friction of the paddle wheels may be reduced to the lowest limit expedient, the journals of their shafts should be fitted with sets of friction apparatus similar to those of the carrier wheel of the impulsoria. The paddle wheels may be arranged either at the sides of the vessel or at its stern and should be supported by a frame which can be moved to raise the wheel or to lower it as may be required to enable the paddles to work always with the same dip whether the vessel be loaded or empty.

Having thus described my apparatus for applying the force exerted by animals to the purposes of locomotion, what I claim therein as new and desire to secure by Letters Patent is—

1. The combination with the endless platform, of an adjusting apparatus by means of which the inclination of the platform to the frame of the power carriage may be varied to enable the horses to work to the best advantage, whether to accelerate or to retard the movement of the impulsoria, in traversing ascending or descending grades.

2. I also claim the method of connecting the frame of the impulsoria with the pilot by means of a longitudinal shaft which is fitted with mechanism by means of which the impulsoria can be adjusted transversely to keep the driving axle level and to prevent the endless platform from sloping crosswise when traversing a road one of whose sides is higher than the other.

3. And lastly I claim in an apparatus adapted to propulsion by animals substantially as herein described the employment of a single driving wheel arranged in such manner as to admit of being leaned toward the hill in traveling across slopes to prevent a transverse sloping of the endless platform on which the animals walk when the wheel thus arranged is steadied by a pilot before and a follower behind or their equivalent substantially as herein set forth.

CLEMENT MESSERANO.

Witnesses:
R. WICKLIFFE, Jr.,
ANDR. CRESTADORA.